Figure 3:
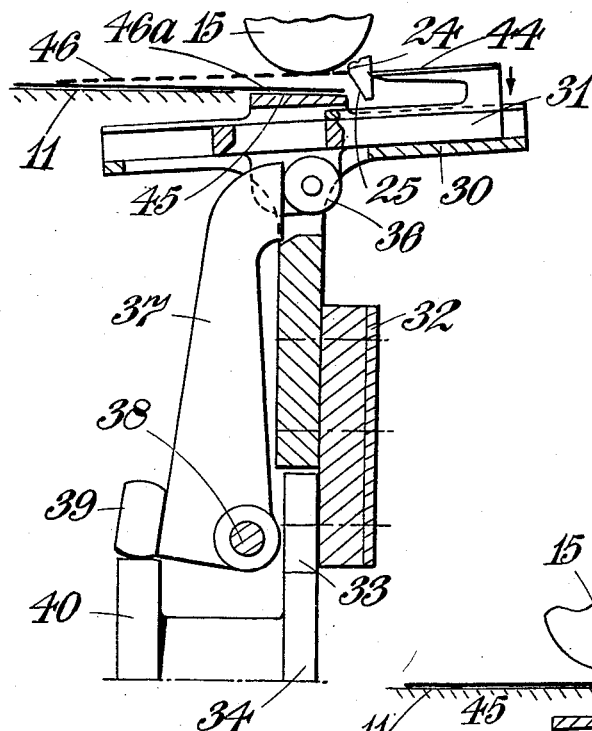
Figure 4:
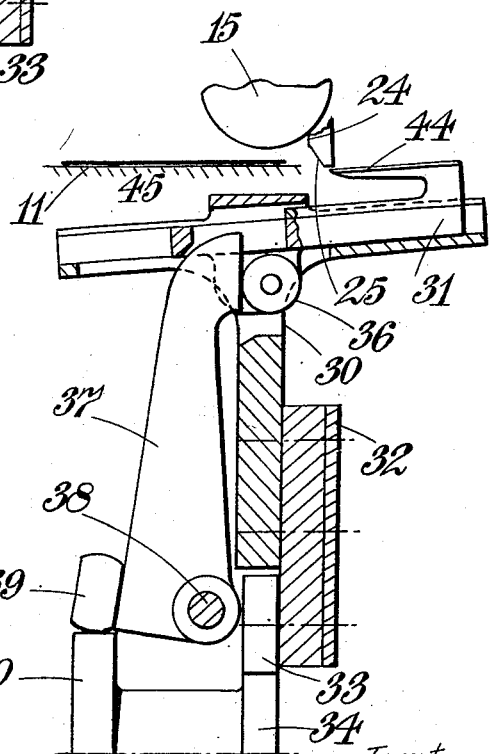

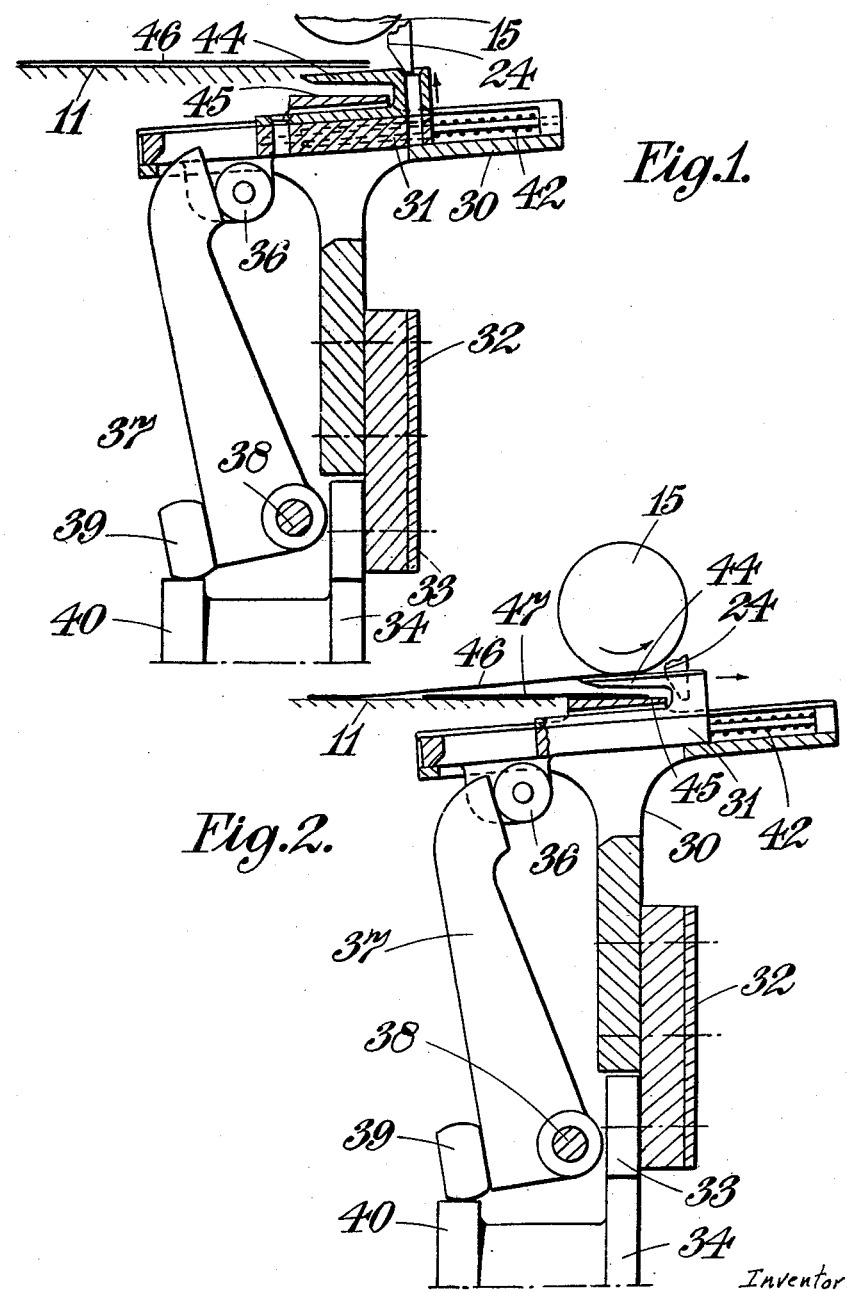

Feb. 11, 1958    H. T. BACKHOUSE ET AL    2,823,030
SHEET REGISTERING MECHANISM
Filed March 30, 1955    6 Sheets-Sheet 2

Feb. 11, 1958 H. T. BACKHOUSE ET AL 2,823,030
SHEET REGISTERING MECHANISM
Filed March 30, 1955 6 Sheets-Sheet 3

Inventors:
Headley Townsend Backhouse
George William Tebbs
By Churchill, Rich, Weymouth & Engel
Attorneys

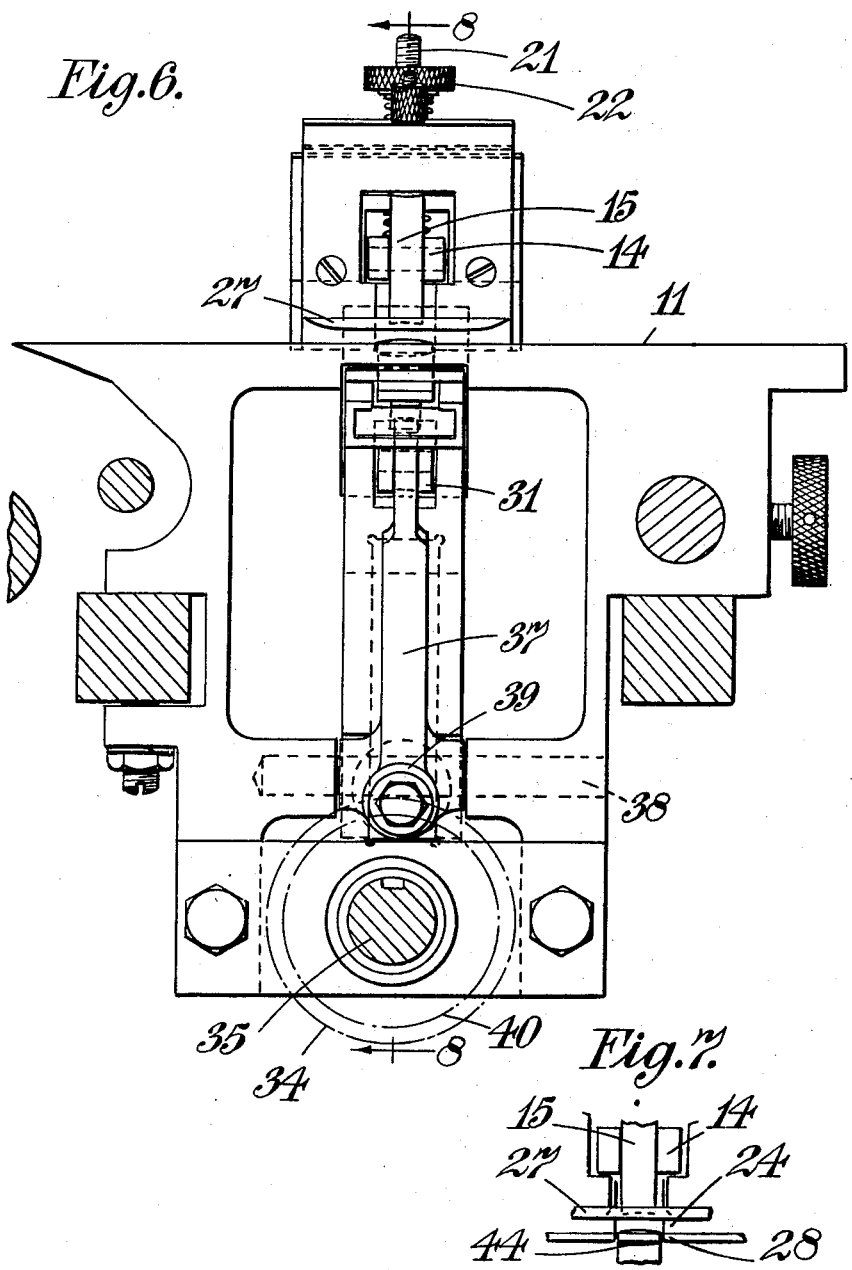

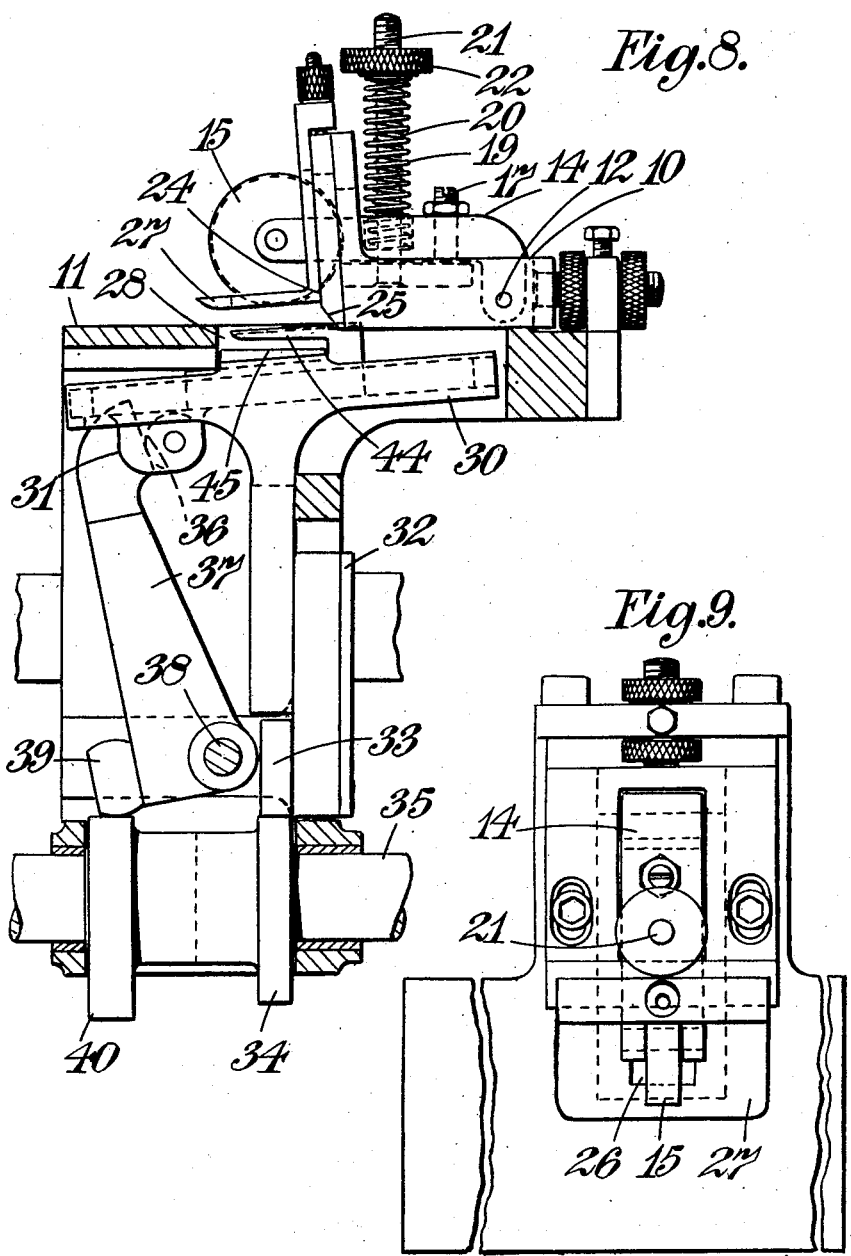

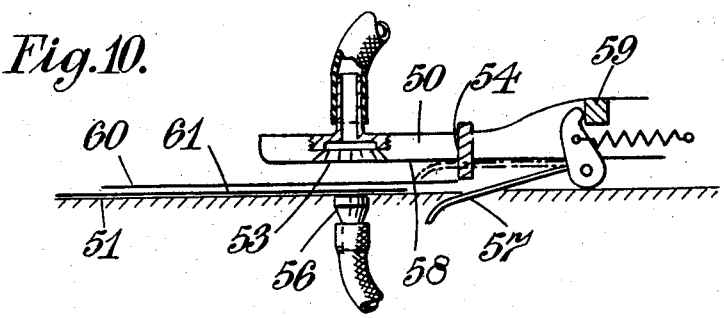
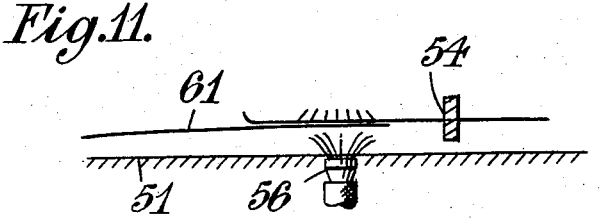
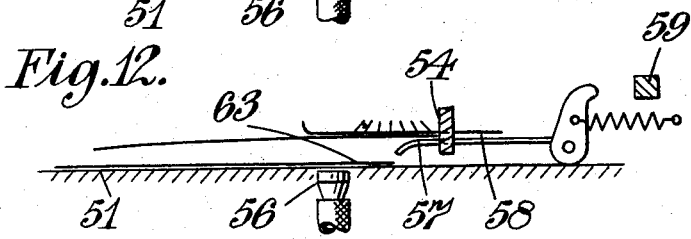
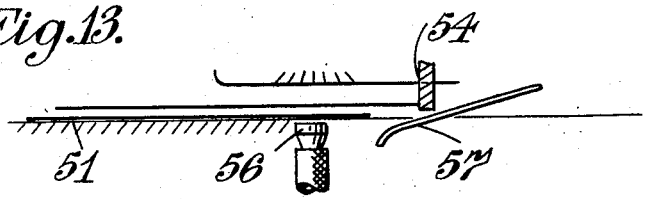
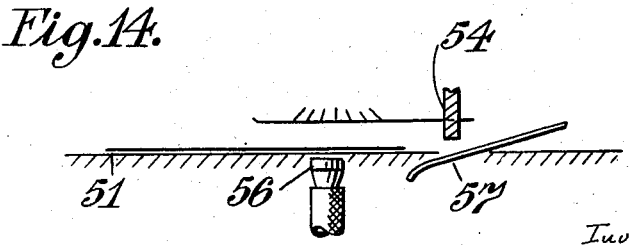

United States Patent Office 2,823,030
Patented Feb. 11, 1958

2,823,030

SHEET REGISTERING MECHANISM

Headley Townsend Backhouse, Fort Charlotte Heights, Nassau, Bahamas, British West Indies, and George William Tebbs, Walthamstow, England; said Tebbs assignor to said Backhouse Application March 30, 1955, Serial No. 497,976

Claims priority, application Great Britain April 9, 1954

17 Claims. (Cl. 271—59)

The invention relates to a mechanism for use in effecting side registration of each sheet in turn of a stream of partly underlapping sheets advancing over a feed-plate or table, during a period in which the advance of the sheet is temporarily stopped (e. g. by front edge registering devices) or slowed down. The mechanism may be used, for example, to effect side registration of sheets of paper, card or the like being fed to a printing or other machine operating on a succession of individual sheets.

The invention is concerned with side registering mechanism of the kind which operates to grip each sheet in turn and to draw the sheet sideways up to a stop or lay. It is found with such mechanisms to be necessary or desirable that the mechanism shall operate to grip the sheet at a position in the stream where there is no overlap of sheets. The mechanism may be arranged to begin to operate on a sheet immediately the tail of the preceding sheet has passed the gripping means but with side registering devices as at present constructed, the arrival of the leading edge of the following sheet at the operating position must be delayed until after the completion of the side laying operation because the mechanism obstructs the path of the sheet. It has already been proposed to avoid such obstruction and delay by lifting the portion of the sheet to be registered above the plate or table and side registering the sheet while so raised thereby leaving a passageway for the succeeding sheet to pass beneath the raised sheet and gripping means. It is an object of the present invention to provide an improved and practical construction of side registering mechanism in which the sheet is raised and registered in this way, thereby enabling the time interval between the removal of the preceding sheet and the arrival of the leading edge of the succeeding sheet at the side lay position to be reduced in a practical manner and other advantages obtained. The saving in time may be employed to increase the time available for front registration or to increase the speed of operation, or both.

The invention provides side registering mechanism for use as above defined and comprising, at a position in the length of the sheet to be registered where, during an early part of the period there is no underlying sheet, a side lay or stop above the feed-plate or table, a gripping member held above the table adjacent to the lay, means for pushing the portion of the sheet to be registered which is beneath the gripping member up to the member to be held thereby and to permit a succeeding sheet to pass under the held sheet and means for drawing the edge of the raised portion of the sheet laterally into engagement with the side lay.

In one form of the mechanism the gripping member is a roller and the means for pushing the sheet up to the roller comprise a blade or tongue lying beneath the sheet substantially parallel thereto and means for moving the tongue upwardly to lift the sheet and to leave a passageway beneath the tongue for the sheet.

In another form of the mechanism the gripping member is a suction gripper and the means for pushing the sheet up to the gripper may comprise an upwardly directed air blast beneath the sheet.

Figure 5:
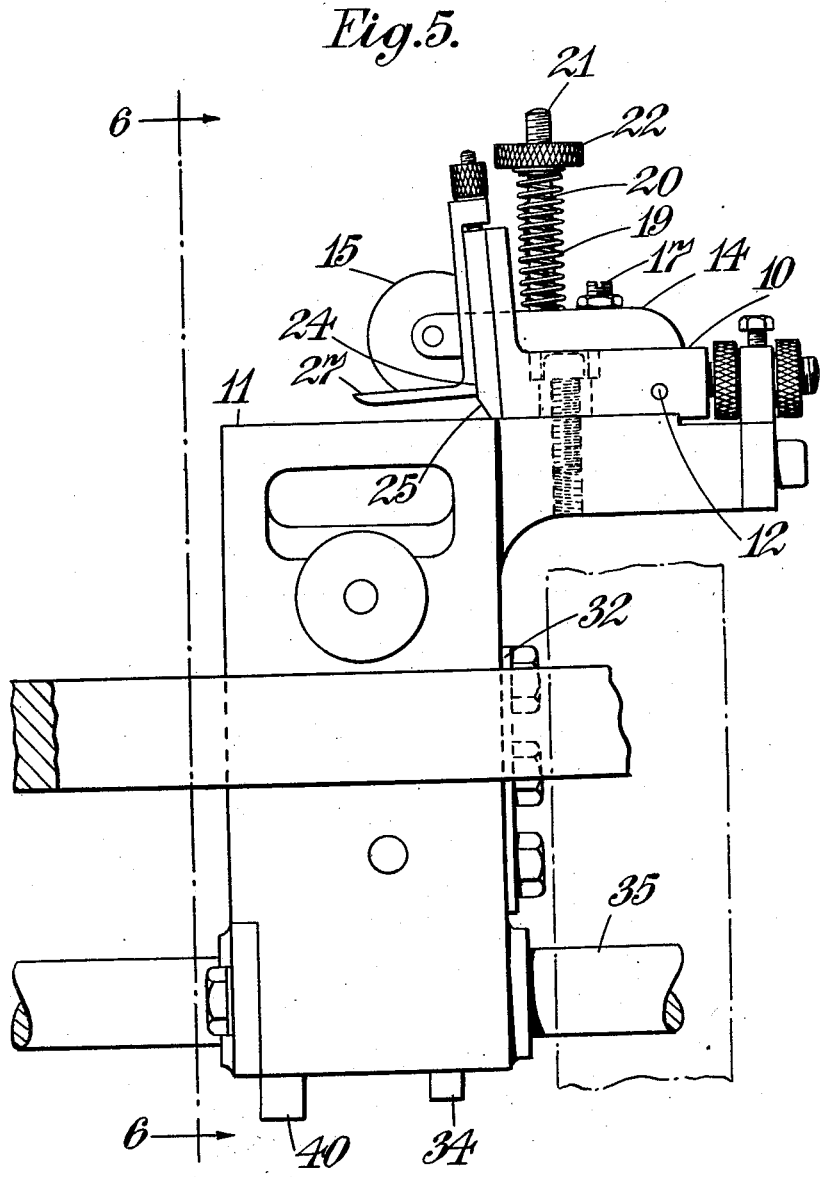

Two specific constructions of side lay mechanisms and their mode of use will now be described by way of example of how the invention may be carried into effect, and with reference to the drawings herein, in which:

Figures 1 to 4 are diagrammatic views showing successive stages in the side-laying of a sheet by the mechanism according to the first example, Figure 5 is a side view, corresponding to Figures 1–4, of the mechanism, Figure 6 is a front view, in the direction 6—6 in Figure 5, of the mechanism, this view showing the mechanism as seen from the centre line of the feeding machine, Figure 7 is an enlarged view of some of the details in Figure 6, Figure 8 is a part section on the line 8—8 in Figure 6, Figure 9 is a plan view of the mechanism, and Figures 10 to 14 are diagrammatic views showing successive stages in the side-laying of a sheet by the mechanism according to the second example.

Each of these examples relates to a machine for feeding sheets of paper to a printing press. The sheets are fed from a sheet separator in the form of a continuous stream of partly underlapped sheets onto a feed-table where they are front and side registered before transfer to the press. To effect front registration each sheet is, in turn, brought to rest against front lays. The front registration is ejected beneath the tail of the preceding sheet being transferred to the press. Movement of the succeeding sheets continues during the period of rest. The sheet is also side-registered during the rest period. The transfer to the press grippers is effected by swinging grippers operating above the registered sheet. The front lays are lowered below the level of the table after registration of each sheet to enable the sheet to be removed and rise beneath the sheet as it is being removed, to engage the next sheet. The side registering mechanisms are positioned a short distance behind the front lays.

In the first example (Figures 1 to 9) the side lay mechanism is mechanical in its operation and comprises an adjustably fixed bracket 10 above a section, 11, of the feed-plate or table. Pivoted at 12 to the bracket there is a lever 14 carrying a roller 15. Downward movement of the lever is limited by an adjustable stop 17 engaging the bracket 10 and when in its lowermost position the roller 15 is spaced above the table 11. Two springs 19, 20 around a guide spindle 21 urge the lever 14 and roller 15 downwardly. The load on the springs is variable by a knurled nut 22 which may be adjusted to relieve entirely the load on the stronger spring 19 so that only the spring 20 is operative. This arrangement provides a substantial range of adjustment of the spring pressure and enables the device to be adjusted for use, for example, on thin paper or card without changing the springs.

The face 24 of the bracket 10 constitutes the side lay registering surface. This face slopes forwardly (i. e. over the table) at an angle to the vertical of about 4° to conform, at least approximately, to the path of the edges of the sheets as they are lifted in the manner later described. The bottom of the face is cut back at 25 so that when a sheet is allowed to fall back onto the table after registration its edge will be clear of the surface and the sheet may be withdrawn without rubbing or tearing against the surface.

The lower part of the roller 15 is received within a slot 26 in a smoother plate 27. The lower surface of this plate is slightly below the bottom of the rubber so that when a sheet is pressed upwardly against the roller as later described the sheet is caused to bulge downwardly by the smoother on each side of the roller which assists in holding down the following sheet.

At a position beneath the roller 15 there is a slot 28 in the table and below the slot there is a guideway 30 for a slide 31. The guideway is itself guided for up and down movement on a guide 32. The lower end of the guideway has a roller 33 which runs on a cam 34 on a shaft 35 to effect up and down movements of the guideway. The slide 31 carries a roller 36 which is engaged by the upper end of one arm of a bell-crank lever 37 which is pivoted on a fixed pivot 38. The other arm of the lever 37 has a roller 39 engaging a cam 40 on the shaft 35. Rotation of the cam 40 rocks the lever 37 to move the slide 31 to the right (as viewed in Figures 1 to 4 and 8) against a return spring 42.

The slide 31 carries a blade or tongue 44 which, in section, is slightly convex on its upper and lower faces. The peripheral surface of the wheel 15 is slightly concave to mate with the upper surface of the tongue. These mating surfaces ensure that a sheet clamped between the surfaces will be slightly bent and thereby stiffened against crumpling against the registering surface. The upper surface of the tongue is suitably roughened to grip the sheets and the tongue may be interchanged with tongues of different degrees of roughness. Beneath the tongue there is, on the guideway, a surface 45 which, when the guideway has been raised to the upper limit of its travel, lies in the slot 28 to form a continuation of the surface of the table and so to guide the following sheet over the slot. The surface 45 may, if preferred, be slightly convex. The guideway for the slide 31 slopes upwardly at an angle of about 4° to conform approximately with the natural droop of the paper.

In the operation of the mechanism a sheet 46, which has been arrested by the front lays and is ready for side registration, lies flat on the table over the tongue 44 as shown in Figure 1. The guideway 30 then rises carrying the slide 31 so that the tongue 44 pushes the sheet up to the roller 15 and grips the sheet against the roller under a pressure determined by the setting of springs 19 and 20. When the guideway is in its raised position the surface 45 closes the slot 28 so that a following sheet 47 may, at the appropriate time travel over the slot without obstruction and beneath the tongue (see Figure 2). The convex under surface of the tongue helps, in combination with the downward bulge of the sheet 46 caused by the smoother 27, to guide the sheet 47 under the tongue. When the sheet 46 has been gripped against the roller, the slide 31 is moved outwardly (i. e. to the right) so that the tongue 44 draws the sheet up to the registering face 24 (Figure 3). The sheet is then arrested but the slide continues its movement until the tongue, slipping on the sheet, is drawn clear of the sheet (Figure 3). The guideway then moves downwardly with the slide (Figure 4) and the slide returns to the left into the position shown in Figure 1 ready for operation on the next sheet (i. e. 47). When the tongue moves from under the sheet, the sheet falls back onto the table, as shown at 46a in Figure 3—the sheet 47 being omitted in this figure for clarity. The slope of the face 24 permits free fall of the sheet in this way and the cut back portion 25 leaves the edge of the sheet free for removal of the sheet, even if the sheet is not cut quite square.

The section 11 carrying the side-lay mechanism constitutes one section of a construction of feed-plate (or table) which consists of several sections. Some of the sections are removable to vary the width of the table and the section 11 carrying the side-lay mechanism is laterally adjustable as a unit to conform with the width changes resulting from the removal or replacement of intermediate sections.

In the second example (Figures 10–14) there is a slide 50 mounted above the feed-table or plate 51 for in and out movement by means of a cam. The slide carries a downwardly directed suction gripper 53 spaced above the table by say ¼ inch. There is also a fixed side gauge 54. Below the level of the table and opposed to the gripper 53 when at its innermost position there is a fixed upwardly directed air nozzle 56. There is also a smoother blade 57 which is pivotally supported outside the lay 54 and is rotatable from a position (Figure 10) in which its free end lies below the table and outside the line of advance of the sheets upwardly to lie adjacent the smoother surface 58 of the bracket (Figure 12) and so to co-operate therewith and to hold the sheet being side-layed against buckling. The blade is spring-urged upwardly and is moved downwardly by an abutment 59 on the gripper slide.

In the operation of this example, when the tail end of the sheet 60 being removed has passed the side-lay position and the next sheet 61 has been front layed, suction is turned on to the gripper 53 and air is turned on to the nozzle 56. The air blast blows the next sheet 61 upwardly to the gripper (Figure 11) which takes hold of the sheet and then moves to draw the sheet to the side-lay (Figure 12). The blade 57 moves upwardly to support the sheet. The way is then clear for the following sheet 63 to pass beneath the side lay mechanism. After side-laying, the gripper releases the sheet and returns to the initial position during the removal of the sheet.

As an alternative to the use of the air blast as just described a mechanical pusher may be used to raise the sheet to the gripper.

We claim:

1. Side registering mechanism for effecting side registration of each leading sheet in turn of an advancing succession of partly underlapping sheets comprising a feed surface for supporting the advancing sheets, a side stop above the feed surface, a gripping member held above the surface, spaced therefrom and adjacent to the stop, means for pushing an edge portion of a sheet which is lying on the surface beneath the gripping member up to the member to be held thereby raised from the surface and to leave the way clear for a succeeding sheet to pass under the held sheet and means for drawing the edge of the held sheet laterally into engagement with the side stop.

2. Side registering mechanism as claimed in claim 1 in which the side stop slopes upwardly and, at a small angle to the vertical inwardly, over the sheet-supporting feed surface.

3. Side registering mechanism as claimed in claim 1 in which the gripping member is a roller.

4. Side registering mechanism as claimed in claim 3 in which the means aforesaid for pushing an edge portion of a sheet which is lying on the surface up to the roller comprises a tongue lying beneath the sheet substantially parallel thereto and means for moving the tongue upwardly to lift the sheet and to leave a passageway beneath the tongue for the succeeding sheet.

5. Side registering mechanism as claimed in claim 4 in which the means for drawing the edge of the sheet laterally operate by moving the tongue laterally in the direction towards the stop while the tongue is co-operating with the roller to grip the sheet.

6. Side registering mechanism as claimed in claim 5 in which the periphery of the roller is concave and the tongue has a convex upper surface for mating therewith.

7. Side registering mechanism as claimed in claim 5 in which the tongue moves towards the stop along a path which slopes upwardly and outwardly at a small angle to the horizontal corresponding to the natural slope of the sheet.

8. Side registering mechanism as claimed in claim 5 in which the movement of the tongue is continued until it is clear of the edge of the sheet, and the tongue is then moved downwardly and returned beneath the sheet.

9. Side registering mechanism as claimed in claim 4 in which the feed surface has an opening through which the tongue passes upwardly and there is a bridging member for the opening which follows, in spaced relation, the tongue during its upward movement and bridges the open- 10. Side registering mechanism as claimed in claim 4 in which the under surface of the tongue provides a downwardly sloping surface presented to the leading edge of a sheet passing beneath the tongue.

11. Side registering mechanism as claimed in claim 1 in which there is a vertical gap between the lower end of the registering face of the stop and the feed surface.

12. Side registering mechanism as claimed in claim 1 in which the gripping member is a roller and there are two springs operable to press the roller downwardly and adjusting means whereby one of the springs may be rendered inoperative.

13. Side registering mechanism as claimed in claim 1 in which the gripping member is a roller and there is a smoother surface before the roller considered in the feeding direction of the sheets, said surface being slightly below the roller whereby a sheet pressed against the roller is deflected downwardly on the sheet approaching side of the roller thereby to tend to guide a succeeding sheet downwardly.

14. Side registering mechanism as claimed in claim 1 in which the gripping member is a suction gripper.

15. Side registering mechanism as claimed in claim 14 in which the means for pushing the sheet up to the suction gripper comprise an upwardly directed air blast beneath the sheet.

16. Side registering mechanism as claimed in claim 1 constructed as a unit with a section of a feed table which provides the feed surface, and adjustable as a unit laterally of the feeding direction.

17. Side registering mechanism for effecting side registration of each leading sheet in turn of an advancing stream of partly underlapping sheets which mechanism comprises a feed table for supporting the stream of advancing sheets and having a slot therein beneath an edge of the stream and transverse to the direction of advance, a side lay above the feed table adjacent the slot and outside the width of the stream, a roller held above the slot for rotation about an axis parallel to the direction of advance of the stream, a tongue beneath the roller with its length transverse to the direction of advance of the stream, means for supporting the tongue for up and down movement transverse to its length between a position in which the tongue is within the slot and a position in which the tongue is spaced above the table and is operative to grip a sheet against the under surface of the roller and for lengthwise movement of the tongue, cam means for effecting such up and down movements and cam means for effecting the lengthwise movements, the two cam means being arranged to operate in timed relation to the advance of each leading sheet and in a cycle in which the tongue is first raised to engage the underside of the leading sheet ahead of the next sheet in the stream to lift the leading sheet and to grip it against the roller, the tongue then being spaced above the table to permit the passage of the next sheet over the table beneath the tongue, the tongue is then moved lengthwise outwardly of the stream to carry the leading sheet laterally to bring the side edge thereof up to the side lay and thereafter continue its movement while slipping on the sheet until the tongue is clear of the edge of the next sheet, the tongue is then lowered and is returned lengthwise beneath the next sheet.

References Cited in the file of this patent

UNITED STATES PATENTS

| | | |
|---|---|---|
| 562,797 | Briggs | June 30, 1896 |
| 2,165,172 | Backhouse | July 4, 1939 |
| 2,422,629 | Muller | June 17, 1949 |